United States Patent
Bobye

(10) Patent No.: US 12,196,557 B2
(45) Date of Patent: Jan. 14, 2025

(54) SYSTEM AND METHOD FOR DEAD RECKONING FOR MARINE POSITIONING APPLICATIONS

(71) Applicant: NovAtel Inc., Calgary (CA)

(72) Inventor: Michael Bobye, Calgary (CA)

(73) Assignee: NovAtel Inc., Calgary (CA)

( * ) Notice: Subject to any disclaimer, the term of this patent is extended or adjusted under 35 U.S.C. 154(b) by 146 days.

(21) Appl. No.: 16/903,847

(22) Filed: Jun. 17, 2020

(65) Prior Publication Data
US 2021/0396521 A1   Dec. 23, 2021

(51) Int. Cl.
*G01C 21/16* (2006.01)
*G01S 19/47* (2010.01)

(52) U.S. Cl.
CPC ............ *G01C 21/165* (2013.01); *G01S 19/47* (2013.01)

(58) Field of Classification Search
CPC ........ G01C 21/165; G01C 21/16; G01S 19/47
See application file for complete search history.

(56) References Cited

U.S. PATENT DOCUMENTS

| | | | | |
|---|---|---|---|---|
| 5,046,011 A | * | 9/1991 | Kakihara | G01C 21/30 340/990 |
| 5,416,712 A | * | 5/1995 | Geier | G01C 21/165 701/472 |
| 6,459,990 B1 | * | 10/2002 | McCall | G01C 21/165 73/178 R |
| 6,522,266 B1 | * | 2/2003 | Soehren | G01S 5/017 600/595 |
| 6,721,657 B2 | | 4/2004 | Ford et al. | |
| 6,738,682 B1 | * | 5/2004 | Pasadyn | G05B 19/41865 700/51 |
| 8,649,999 B1 | * | 2/2014 | Sheng | G01P 21/00 702/141 |
| 2005/0060093 A1 | * | 3/2005 | Ford | G01C 21/165 701/472 |
| 2007/0032950 A1 | * | 2/2007 | O'Flanagan | G01S 19/47 701/472 |
| 2009/0156126 A1 | * | 6/2009 | Willis | G01S 11/06 455/41.3 |
| 2010/0079334 A1 | * | 4/2010 | Roh | G01C 21/165 342/357.29 |
| 2010/0088030 A1 | * | 4/2010 | Stephens | G01C 21/16 701/500 |
| 2014/0222361 A1 | * | 8/2014 | Sheng | G06F 3/038 702/94 |
| 2014/0260517 A1 | * | 9/2014 | Demerly | G01P 21/00 73/1.38 |
| 2014/0270380 A1 | | 9/2014 | Morin | |

(Continued)

OTHER PUBLICATIONS

NPL_Moving_avg_2012 (Year: 2012).*

(Continued)

*Primary Examiner* — Kyle R Quigley

(74) *Attorney, Agent, or Firm* — Cesari and McKenna, LLP

(57) ABSTRACT

A system and method for dead reckoning for marine positioning applications is provided. After INS mechanization, an exponential moving average (EMA) is calculated that is used to generate an update for a Kalman filter. The use of the EMA allows the system to limit position error in a linear fashion while being self-contained.

20 Claims, 5 Drawing Sheets

(56) References Cited

U.S. PATENT DOCUMENTS

| | | | | |
|---|---|---|---|---|
| 2014/0372026 A1* | 12/2014 | Georgy | ............... | G01S 19/47 |
| | | | | 701/469 |
| 2015/0223753 A1* | 8/2015 | Perkins | ............... | A61B 5/686 |
| | | | | 600/302 |
| 2018/0292212 A1* | 10/2018 | Bobye | ............... | G01C 21/165 |
| 2020/0064136 A1* | 2/2020 | Henderson | ............ | G01C 21/18 |

OTHER PUBLICATIONS

Polly et al ,Moving average—Simple and exponential ,2019 (Year: 2019).*

Fikri et al., EMA and Dlkf, IEEE, 2019 (Year: 2019).*

Treloar, Examining the EMA, Stocks and Commodities Magazine, 2012 (Year: 2012).*

Jiazhen Lu et al. "Ocean Vehicle Inertial Navigation Method based on Dynamic Constraints", The Journal of Navigation (2018), 71, 1553-1566, 14 pages.

"European Search Report and Written Opinion," European Application No. 21 176 082.2-1001, Applicant: NovAtel Inc., Date of Mailing: Nov. 16, 2021, pp. 1-11.

Yu, Hongzhe, et al., "State Estimation for Swarm UAVs Under Data Dropout Condition," Springer, Springer Nature Switzerland AG, Intelligent Robotics and Applications, ICIRA 2018, Lecture Notes in Computer Science, vol. 10984, Aug. 3, 2018, pp. 81-91.

\* cited by examiner

SYSTEM AND METHOD FOR DEAD RECKONING FOR MARINE POSITIONING APPLICATIONS

BACKGROUND

Technical Field

The present invention is directed to inertial navigation systems, and more particularly to inertial navigation systems for stationary or low dynamic marine vessels.

Background Information

During certain operations, marine vessels are required to perform station keeping, i.e., remain at a substantially fixed position or remain within a predefined distance from a fixed position. One example of a station keeping environment is a floating oil drilling platform. The oil platform is required to remain over the drill head, or no more than a predefined distance away from the drill head, to minimize stress on the piping from the drill head to the platform. Should the platform move more than the predefined distance away from the drill head, the piping may exceed its actual strength and break, thereby releasing oil into a body of water.

A marine vessel may utilize a Global Navigation Satellite System (GNSS) implementation to provide precise position information which enables the vessel's crew to perform necessary operations for station keeping. However, in the event of a loss of GNSS signals, either due to system failure, a jamming operation, etc., the vessel may drift beyond the predefined distance due to external forces, e.g., wave action, currents, etc. If the loss of GNSS position data extends for a significant time period, the probability of the vessel exceeding the predefined safe distance increases.

A marine vessel may use an inertial navigation system (INS) that works in conjunction with a GNSS system to provide accurate position information. A noted disadvantage of INS systems is that they do not operate well under low dynamic conditions, i.e., when a vessel is stationary or moving at a very slow speed, such as if it is drifting with the current or wave motion. If the only motion of a vessel is caused by waves and/or current, a conventional INS system will rapidly lose the ability to provide accurate position information.

One objective for station keeping is to be able to maintain a position within 20 meters of a fixed position for the duration of a 900 second (15 minute) outage of GNSS position information. Due to the motion induced by waves and/or currents, it is difficult to apply an update to the INS filter that is external to the system. For example, a conventional zero velocity update cannot be used as the vessel may be in motion due to waves and/or current. An average position collected from when GNSS data was available may be fed back as a potential position update during the outage. However, if real motion occurs and the vessel drifts, then the INS filter could become unstable.

SUMMARY

The disadvantages of the prior art are overcome by providing a system and method for dead reckoning navigation in marine applications in accordance with illustrative embodiments of the present invention. Data from an Inertial Measurement Unit (IMU) is collected and fed into an Inertial Navigation System (INS) mechanization process. The INS mechanization output is used to calculate an exponential moving average (EMA) using the instantaneous INS mechanized velocity. An update for a Kalman filter is calculated using the EMA velocity as well as the difference between the mechanized INS positions between two update intervals. The Kalman filter generates corrections to IMU data which are then used by the IMU to correct data for the next update cycle.

By using the EMA, the system is self-contained and does not require any external input, e.g., GNSS information, etc. In operation, the system limits error growth to a linear rate as compared to an exponential rate for an unconstrained system. This enables the system to meet station keeping requirements in low dynamic environments if GNSS data is unavailable for a substantial amount of time, e.g. 900 seconds.

BRIEF DESCRIPTION OF THE DRAWINGS

The above and further advantages of the present invention are described in connection with the accompanying figures in which like reference numerals indicate identically or functionally similar elements, of which.

DETAILED DESCRIPTION OF AN ILLUSTRATIVE EMBODIMENT

Figure 1:
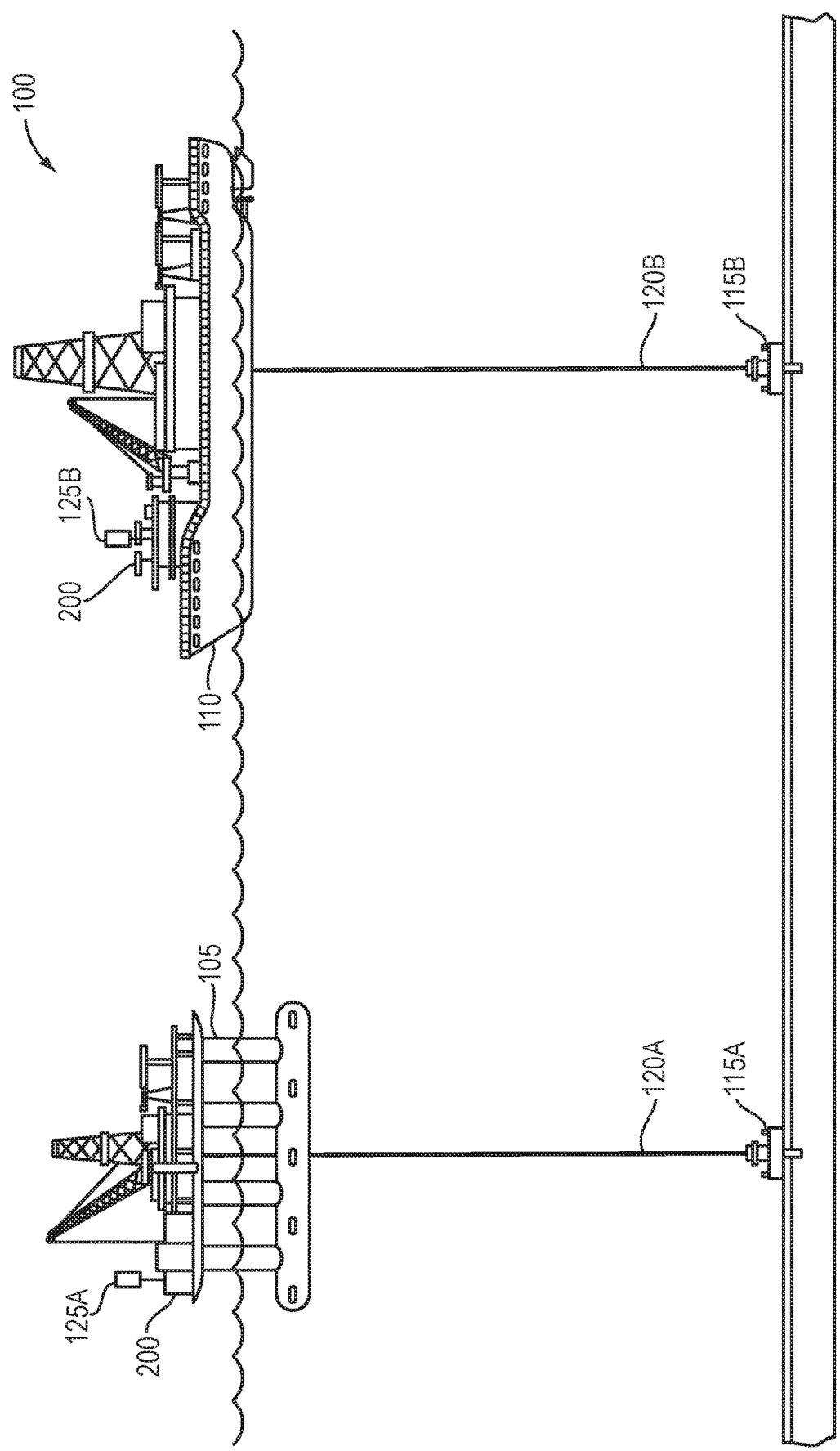
FIG. 1 is a view of an exemplary marine environment illustrating exemplary marine vessels that may need to perform station keeping in accordance with an illustrative embodiment of the present invention.

FIG. 1 is a view of an exemplary marine environment 100 illustrating exemplary marine vessels 105, 110 that may need to perform station keeping in accordance with an illustrative embodiment of the present invention. Environment 100 illustrates two differing marine vessels 105, 110 for illustrative purposes. As will be appreciated by those skilled in the art, in real world applications, a marine vessel typically may be situated a substantial distance away from any other vessels, e.g., located above an oil well head in the middle of a body of water. Therefore, the depiction of two marine vessels 105, 110 being in close proximity should be taken as exemplary to illustrate various examples of vessels that may need to perform station keeping. As will be appreciated by those skilled in the art, other vessels may need to perform a similar station keeping operation. It should be noted that while the present invention is written in terms of a marine vessel performing station keeping, the principles of the present invention may be utilized in any low dynamic environment. Therefore, the description of station keeping should be taken as exemplary only.

A first exemplary marine vessel 105 is a floating oil rig. The second exemplary marine vessel 110 is a drilling ship. Each is shown above an exemplary well head 115A, B. A length of piping 120A, B operatively connects the drilling heads 115 to the vessels 105, 110 and is used to convey oil from the well head 115 to the vessel 105, 110. In operation, the vessels will need to remain substantially over the well head 115 to avoid placing too much strain on piping 120. Should a vessel move too far away, the piping may burst, thereby causing environmental damage due to, e.g., the release of oil into a marine environment.

In order to remain in a station keeping position, i.e., within a predefined range from the well head 115, the vessel may use its propeller, thrusters, or other maneuvering devices to maintain its station keeping location. As will be appreciated by those skilled in the art, marine vessels may utilize any of a plurality of differing maneuvering devices to control movement. These maneuvering devices may be engaged to counter the effects of external forces, e.g., waves and/or currents to cause the marine vessel to maintain a position that is within the predefined range from the well head.

Each marine vessel also includes an exemplary GNSS antenna 125A, B that is operatively interconnected with a navigation system 200, described further below in reference to FIG. 2. Illustratively, the navigation system 200 may comprise an Inertial Navigation System (INS) working in conjunction with a Global Navigation Satellite System (GNSS). The navigation system 200 may provide position information to the crew of the vessel 105, 110, which can then control the maneuvering devices of the vessel to perform station keeping. In alternative embodiments, the navigation system 200 may be operatively interconnected with a vessel control system to automatically perform station keeping maneuvering operations. Such automated station keeping control systems may be implemented as is known in the art. One requirement of such automated systems is precise position information so that the automated system may invoke the appropriate maneuvering operations to maintain its station.

Figure 2:
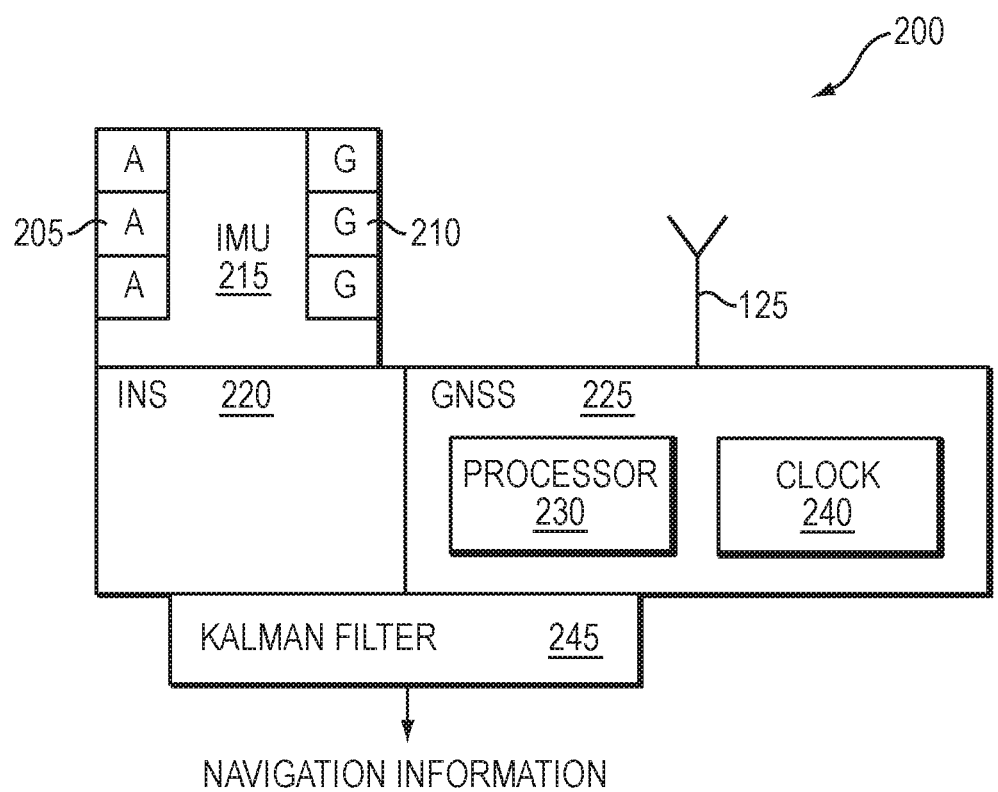
FIG. 2 is a schematic block diagram of an exemplary navigation system including an Inertial Navigation System (INS) sub-system and a Global Navigation Satellite System (GNSS) sub-system in accordance with an illustrative embodiment of the present invention.

FIG. 2 is a schematic block diagram of an exemplary navigation system 200 that illustratively comprises an Inertial Navigation System (INS) sub-system 220 and Global Navigation Satellite System (GNSS) sub-system 225 in accordance with an illustrative embodiment of the present invention. One exemplary GNSS/INS system is described in U.S. Pat. No. 6,721,657, entitled INERTIAL GPS NAVIGATION SYSTEM, by Thomas J. Ford, et al, issued on Apr. 13, 2004.

The GNSS/INS system 200 includes an INS sub-system 220 and a GNSS sub-system 225 that operate under the control of a processor 230, to calculate GNSS position and velocity, INS position, velocity and attitude, and combined GNSS/INS position, velocity, and attitude information. The GNSS subsystem processes the satellite signals received over the antenna 125. The INS system receives measurements from an inertial measurement unit ("IMU") 215 that reads data from accelerometers 205 and gyroscopes 210. The data from the IMU 215 is time tagged by the GNSS clock 240. The GNSS and INS systems can thus reliably interchange position-related information that is synchronized in time. The two systems operate together, through software integration in the processor 230, to provide position-related information between the systems.

For ease of understanding, the description of the processing operations of the two systems are made without specific reference to the processor 230. The system may instead include dedicated GNSS and INS sub-processors that communicate with one another at appropriate times to exchange information that is required to perform the various GNSS and INS calculation operations discussed below. For example, the INS sub-processor communicates with the GNSS processor when IMU data is provided to the sub-processor, in order to time-tag the data with GNSS time. Further, the GNSS sub-processor communicates with the INS sub-processor to provide GNSS position information at the start of each measurement interval, and so forth.

At start-up, the GNSS system 225 operates in a known manner to acquire the signals from at least a minimum number of GNSS satellites and calculate pseudoranges to the respective satellites and associated Doppler rates. Based on the pseudoranges, the GNSS system determines its position relative to the satellites. The GNSS system may also determine its position relative to a fixed-position base receiver (not shown), either through the use of differential correction measurements generated at the base station or after resolving associated carrier cycle ambiguities.

At the same time, the INS system 220 processes the IMU data, that is, the measurements from the various accelerometers 205 and gyroscopes 210, to determine the initial attitude and velocity of the receiver. This may include the addition of external input to determine the initial conditions. The INS system further processes both the IMU data and the GNSS position and associated covariance information to set up various states for a Kalman filter 245. At the start of each measurement interval, the INS subsystem updates the Kalman filter and provides updated error states to an INS mechanization process. The INS mechanization process uses the updated information and the IMU data to propagate, over the measurement interval, the inertial position, attitude and velocity, with the inertial position and other system element errors being corrected with GNSS observations at the start of the measurement interval.

The INS mechanization process outputs are utilized to calculate an exponential moving average (EMA) velocity. The EMA velocity is converted into a delta across a long period to determine true motion. This delta position update is self-contained and does not require any external information, such as when GNSS input is unavailable. The use of an average observation allows for low dynamics to occur without making the system unstable. This is described in detail in relation to FIG. 3, described further below.

The IMU illustratively 215 plugs into a port (not shown) of the processor 230 and through the port supplies accelerometer and gyroscope measurement data to the processor. The IMU may be selected from a number of models and/or types, each associated with a different scaling factor and nominal accelerometer and gyroscope bias levels. The user may select a particular IMU model for navigation operations based on price and/or on the particular characteristics of the IMU along with the operational requirements.

A Kalman filter 245 processes estimates a series of parameters that describe and predict the behavior of a system. The Kalman filter 245 operates with a set of state variables that describe errors in the system and an associated variance covariance matrix that describes the current knowledge level of the state. The Kalman filter 245 maintains an optimal estimate of the system errors and associated covariance over time and in the presence of external measurements through the use of propagation and updating processes. Illustratively, the covariance factor may be determined as a function of the standard deviation of the samples used to estimate the EMA.

To propagate the state and its covariance from some past time to the current time, the Kalman filter propagation uses knowledge of the state dynamic behavior determined from the physics of the system and the stochastic characteristics of the system over time. Kalman filter updates thus uses the linear relationship between the state and observation vectors in conjunction with the covariance matrices related to those vectors to determine corrections to both the state vector and the state covariance matrix.

As noted above, the description contained herein comprises an exemplary embodiment of a GNSS/INS system. It is expressly noted that the principles of the present invention may be utilized with other systems. As such, the description contained herein should be taken as exemplary only.

Figure 3:
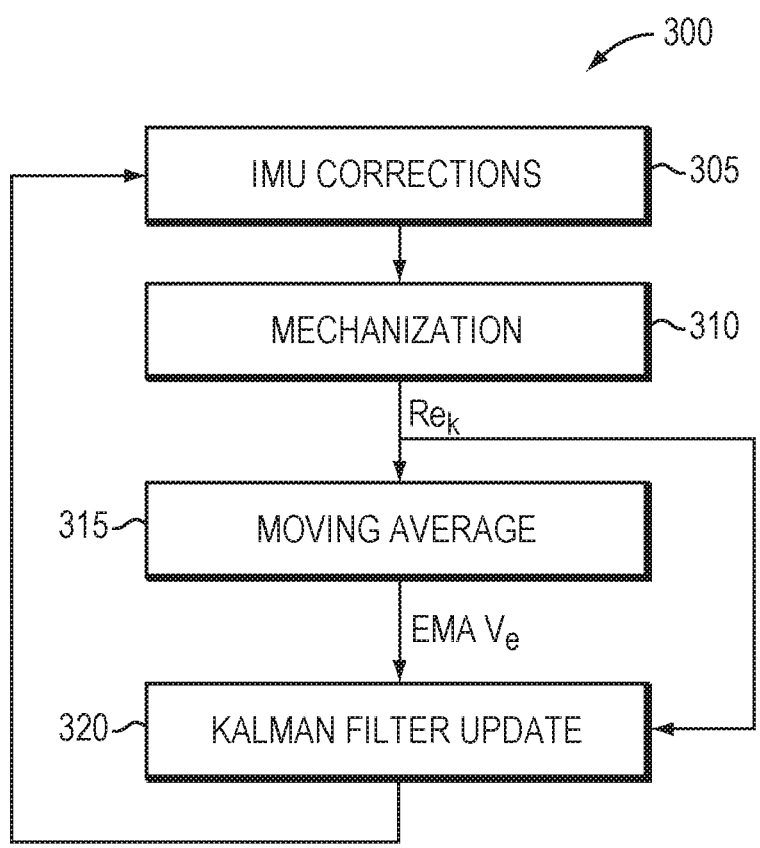
FIG. 3 is a flowchart illustrating the steps of a procedure for calculating position information and IMU corrections in accordance with an illustrative embodiment of the present invention.

FIG. 3 is a flowchart illustrating the steps of a procedure 300 for calculating position information in accordance with an illustrative embodiment of the present invention. Illustratively, the procedure 300 continuously loops to provide updates to the IMU to enable improved position information in the absence of GNSS position information. In one illustrative embodiment, the update interval is 1 Hertz. However, it should be noted that, in accordance with alternative embodiments of the present invention, differing update intervals may be utilized. Therefore, the description of a 1 Hz update interval should be taken as exemplary only.

In step 305, IMU corrections are applied to the data obtained by the IMU. Illustratively, the IMU corrections are received from the Kalman filter update in step 320, described further below. The correction of IMU data may be performed by any technique, as is known by those skilled in the art. The IMU data is then fed into the INS mechanization process in step 310. The INS mechanization process may be accomplished using conventional INS mechanization techniques as are well known in the art. The INS mechanization outputs, inter alia, velocity (Ve) and position (Re). The mechanized position for the current update interval k ($Re_k$) is also forwarded directly to the Kalman filter update step 320, described further below.

Then, in step 315, an exponential moving average (EMA) is calculated. The EMA is utilized to minimize error, by limiting error from an exponential growth to a linear growth rate. Illustratively, the EMA is calculated as:

$$EMA\ Ve_k = (INS\ Ve_k - EMA\ Ve_{k-1}) \times \alpha + EMA\ Ve_{k-1}$$

where $\alpha = 2/(1+\text{Number of Samples})$.

That is, the new EMA Ve is equal to the difference between the instantaneous INS Ve and the current EMA Ve multiplied by a scaling factor ($\alpha$) and then added to the current EMA Ve. This enables the system to be self-contained and does not require any external inputs. Further, by using the average observation, the system allows for low dynamics to occur without rendering the system unstable.

The Number of Samples (NOS) may be set dynamically by the system or by user input. The system may determine whether it is operating in a high or low dynamic setting and adjust the NOS value accordingly. In alternative embodiments, there may be a user interface that permits an operator to adjust the NOS value, either directly or by, e.g., selecting a High or Low dynamic setting. It should be noted that while there is shown and described an equation for $\alpha$, in accordance with alternative embodiments of the present invention, $\alpha$ may be calculated using different equations. It is expressly contemplated that the scaling factor ($\alpha$) may be computed from the NOS using a plurality of techniques. Therefore, the description of $\alpha = 2/(1+\text{NOS})$ should be taken as exemplary only.

Then in step 320, the Kalman filter 245 is updated to produce IMU correction values that are fed back into the INS sub-system in step 305. Illustratively, the update and update weight input to the Kalman filter are illustratively calculated as:

$$\text{Update} = (EMA\ Ve_k) \times \text{Time} - (INS\ Re_k - INS\ Re_{k-1})$$

$$\text{Update Weight} = INS\ Ve\ \text{Covariance} \times \text{CovFactor}$$

INS $Re_k$ represents the INS mechanized position at time k. The Time value is equal to the time difference between the values of INS $Re_k$ and INS $Re_{k-1}$. The Covariance Factor (CovFactor) is utilized because the system velocity is being used as a relative position update. Typically, the velocity variance estimates are an order of magnitude lower than the position variance. If this variance was not adjusted, the difference (error) between the EMA and the instantaneous values would be accepted as system error. This would cause incorrect data being fed into the Kalman filter, which would quickly cause the system to become unstable and the solution to diverge.

Figure 5:
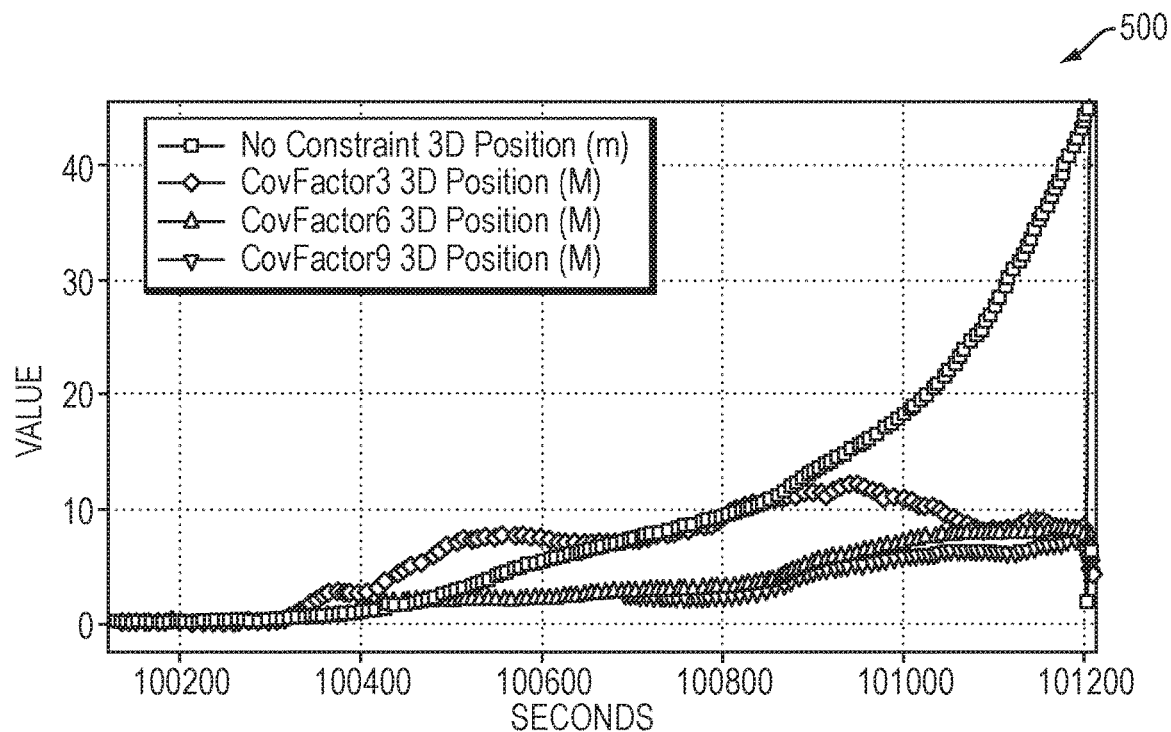
FIG. 5 is a graph illustrating position error for various Covariance Factor values in a stationary environment in accordance with an illustrative embodiment of the present invention.
Figure 6:
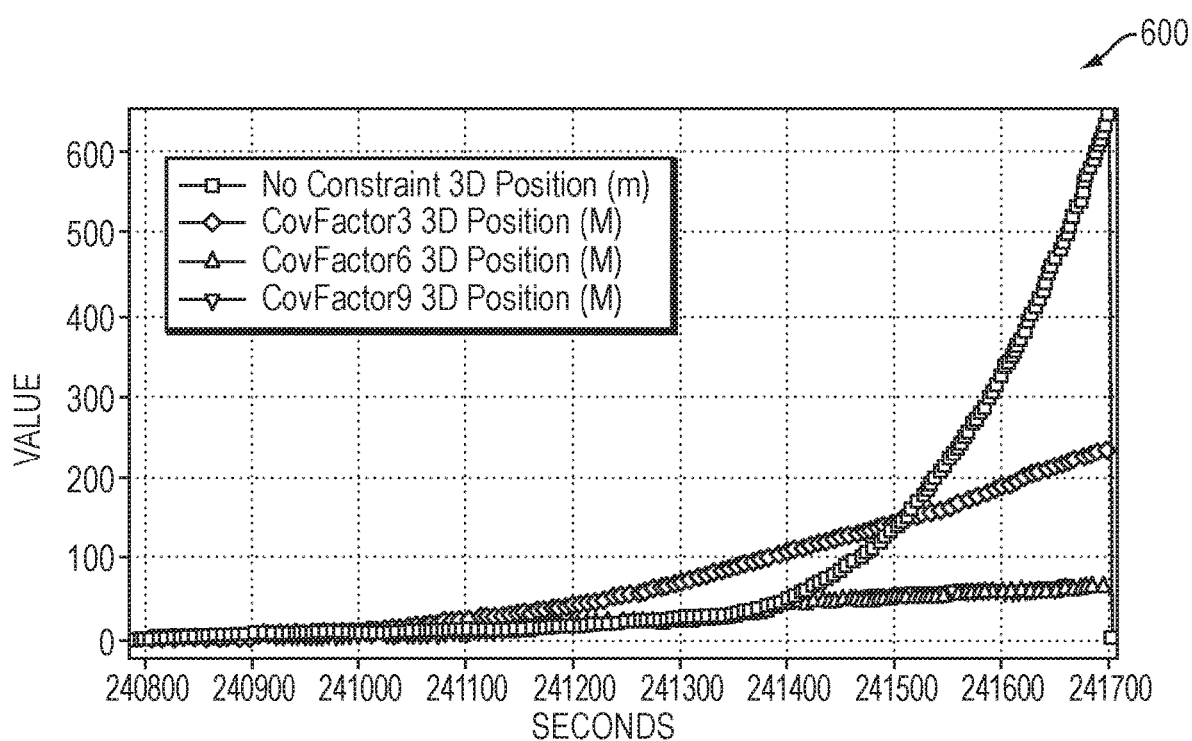
FIG. 6 is a graph illustrating position error for various Covariance Factor values in a low dynamic environment in accordance with an illustrative embodiment of the present invention.

In accordance with illustrative embodiments of the present invention the CovFactor may be used to reduce the weight applied to the delta position update generated from the EMA, thereby reducing the effects of false observability on the INS filter. FIGS. 5 and 6, described further below, illustrate the effects of differing CovFactors in accordance with illustrative embodiments of the present invention.

Figure 4:
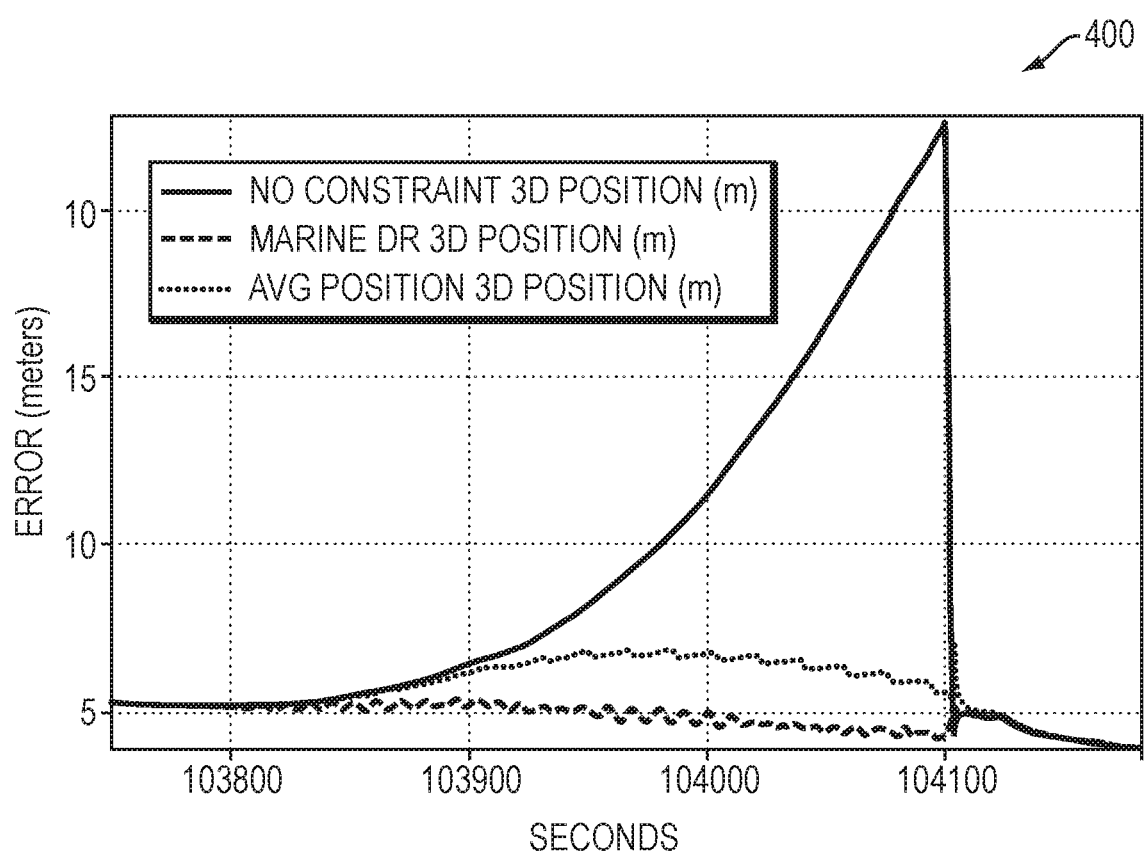
FIG. 4 is a graph illustrating position error during a 300 second GNSS outage in accordance with an illustrative embodiment of the present invention.

FIG. 4 is a graph illustrating position error during a 300 second GNSS outage in accordance with an illustrative embodiment of the present invention. As can be seen in FIG. 4, with no constraint, the position error exponentially grows during the 300 second outage, from time 103800 to time 104100.

FIG. 5 is a graph 500 illustrating position error for various CovFactor values in a stationary environment in accordance with an illustrative embodiment of the present invention. Graph 500 illustrates position error for an unconstrained system as well as for CovFactors values of 3, 6, and 9. It should be noted that the selection of these CovFactors is for illustrative purposes. In accordance with alternative embodiments of the present invention, differing CovFactors may be utilized. Therefore, the description of using CovFactors 3, 6, or 9 should be taken as exemplary only.

FIG. 6 is a graph 600 illustrating position error for various CovFactor values in a slow directional motion environment in accordance with an illustrative embodiment of the present invention. Graph 600 illustrates position error for an unconstrained system as well as for CovFactors 3, 6, and 9. It should be noted that the selection of these CovFactors is for illustrative purposes. In accordance with alternative embodiments of the present invention, differing CovFactors may be utilized. Therefore, the description of using CovFactors 3, 6, or 9 should be taken as exemplary only.

The present invention has been described in accordance with various exemplary embodiments. It should be noted that it is expressly contemplated that various alternative embodiments may be utilized to implement the principles of the present invention. Therefore, the description contained herein should be interpreted to include such alternative embodiments. Various specific values have been given as examples. It is expressly contemplated that differing values may be utilized in accordance with alternative embodiments of the present invention.

What is claimed is:

1. A computer implemented method for operating in dead-reckoning mode when Global Navigation Satellite System (GNSS) information is not available, the method comprising:
   obtaining a set of motion data from an inertial measurement unit (IMU) that includes one or more accelerometers and/or one or more gyroscopes;
   performing, by an inertial navigation system (INS), an INS mechanization on the set of motion data to calculate a current INS position and a current INS velocity;
   calculating an updated exponential moving average (EMA) velocity using the current INS velocity and a previous EMA velocity;
   updating a Kalman filter using the updated EMA velocity, which is used as a relative position update or a delta position update, and the current INS position;
   generating, by the Kalman filter and in response to updating the Kalman filter, IMU corrections; and
   using the IMU corrections to correct a different set of motion data.

2. The computer implemented method of claim 1, further comprising using the IMU corrections for a next interval.

3. The computer implemented method of claim 1, wherein the updated EMA velocity is calculated as:

$$\text{updated EMA velocity} = (\text{INS } Ve_k - \text{EMA } Ve_{k-1}) \times \alpha + \text{EMA } Ve_{k-1},$$

wherein INS $Ve_k$ is the current INS velocity, EMA $Ve_{k-1}$ is the previous EMA velocity, and $\alpha$ is a scaling factor.

4. The computer implemented method of claim 3, wherein $\alpha$ is calculated utilizing at least a number of samples in a current interval for which the updated EMA velocity is being calculated.

5. The computer implemented method of claim 4, wherein $\alpha = 2/(1+\text{NOS})$ and NOS is equal to the number of samples in the current interval for which the updated EMA velocity is being calculated.

6. The computer implemented method of claim 1, wherein updating the Kalman filter comprises calculating an update input to the Kalman filter, and wherein $$\text{update input to the Kalman filter} = (\text{EMA } Ve_k) \times \text{Time} - (\text{INS } Re_k - \text{INS } Re_{k-1})$$

where EMA $Ve_k$ is the updated EMA velocity, Time represents a length of time between a current interval (k) and a previous interval (k−1), INS $Re_k$ is an INS position at k and INS $Re_{k-1}$ is an INS position at k−1.

7. The computer implemented method of claim 6, wherein an update weight input for updating the Kalman filter is equal to an INS velocity covariance multiplied by a covariance factor.

8. A system for operating in dead-reckoning mode when Global Navigation Satellite System (GNSS) information is not available, the system comprising:
   an inertial measurement unit (IMU) including one or more accelerometers and/or one or more gyroscopes, the IMU configured to obtain a set of motion data;
   an inertial navigation system (INS) configured to perform INS mechanization on the set of motion data to calculate a current INS position and a current INS velocity;
   a processor configured to calculate an updated exponential moving average (EMA) velocity using the current INS velocity and a previous EMA velocity;
   a Kalman filter configured to be updated using the updated EMA velocity, which is used as a relative position update or a delta position update, and the current INS position calculated from the set of motion data obtained from the IMU, the Kalman filter further configured to generate IMU corrections in response to updating the Kalman filter; and
   wherein the IMU corrections are used to correct a different set of motion data.

9. The system of claim 8, wherein the Kalman filter is further configured to provide the IMU corrections for a next interval to correct the different set of motion data.

10. The system of claim 8, wherein the updated EMA velocity is calculated as:

$$\text{updated EMA velocity} = (\text{INS } Ve_k - \text{EMA } Ve_{k-1}) \times \alpha + \text{EMA } Ve_{k-1},$$

wherein INS $Ve_k$ is the current INS velocity, EMA $Ve_{k-1}$ is the previous EMA velocity, and $\alpha$ is a scaling factor.

11. The system of claim 10, wherein $\alpha$ is calculated based on a number of samples in a current interval for which the updated EMA velocity is being calculated.

12. The system of claim 11, wherein $\alpha = 2/(1+\text{NOS})$ and NOS is equal to the number of samples in the current interval for which the updated EMA velocity is being calculated.

13. The system of claim 8 wherein the Kalman filter is further configured to calculate an update input to the Kalman filter, and wherein $$\text{update input to the Kalman filter} = (\text{EMA } Ve_k) \times \text{Time} - (\text{INS } Re_k - \text{INS } Re_{k-1})$$

where EMA $Ve_k$ is the updated EMA velocity, Time represents a length of time between a current interval (k) and a previous interval (k−1), INS $Re_k$ is an INS position at k and INS $Re_{k-1}$ is an INS position at k−1.

14. The system of claim 13, wherein an update weight input for updating the Kalman filter is equal to an INS velocity covariance multiplied by a covariance factor.

15. One or more non-transitory computer-readable media, having stored thereon instructions that when executed by a computing device, cause the computing device to perform operations for operating in dead-reckoning mode when Global Navigation Satellite System (GNSS) information is not available, the operations comprising:
   obtaining a set of motion data from an inertial measurement unit (IMU) that includes one or more accelerometers and/or one or more gyroscopes;
   performing, by an inertial navigation system (INS), an INS mechanization on the set of motion data to calculate a current INS position and a current INS velocity;
   calculating an updated exponential moving average (EMA) velocity using the current INS velocity and a previous EMA velocity;
   updating a Kalman filter using the updated EMA velocity, which is used as a relative position update or a delta position update, and the current INS position;
   generating, in response to updating the Kalman filter, IMU corrections; and
   using the IMU corrections to correct a different set of motion data.

16. The non-transitory computer-readable media of claim 15, the operations further comprising using the IMU corrections for a next interval.

17. The non-transitory computer-readable media of claim 15, wherein the updated EMA velocity is calculated as:

$$\text{updated EMA velocity} = (\text{INS } Ve_k - \text{EMA } Ve_{k-1}) \times \alpha + \text{EMA } Ve_{k-1},$$

wherein INS $Ve_k$ is the current INS velocity, EMA $Ve_{k-1}$ is the previous EMA velocity, and $\alpha$ is a scaling factor.

18. The non-transitory computer-readable media of claim 17, wherein $\alpha$ is calculated utilizing at least a number of samples in a current interval for which the updated EMA velocity is being calculated.

19. The non-transitory computer-readable media of claim 18, wherein $\alpha = 2/(1+NOS)$ and NOS is equal to the number of samples in the current interval for which the updated EMA velocity is being calculated.

20. The non-transitory computer-readable media of claim 15, the operations further comprising calculating an update input to the Kalman filter, wherein $$\text{update input to the Kalman filter} = (\text{EMA } Ve_k) \times \text{Time} - (\text{INS } Re_k - \text{INS } Re_{k-1})$$

where EMA $Ve_k$ is the updated EMA velocity, Time represents a length of time between a current interval (k) and a previous interval (k−1), INS $Re_k$ is an INS position at k and INS $Re_{k-1}$ is an INS position at k−1.

* * * * *

UNITED STATES PATENT AND TRADEMARK OFFICE
CERTIFICATE OF CORRECTION

| | | |
|---|---|---|
| PATENT NO. | : 12,196,557 B2 | Page 1 of 1 |
| APPLICATION NO. | : 16/903847 | |
| DATED | : January 14, 2025 | |
| INVENTOR(S) | : Michael Bobye | |

It is certified that error appears in the above-identified patent and that said Letters Patent is hereby corrected as shown below:

In the Specification

Column 5, Line 64 should read:
"there is shown and described an equation for α, in accor-"

Column 5, Line 66 should read:
"tion, α may be calculated using different equations. It is"

Signed and Sealed this
Eleventh Day of March, 2025

Coke Morgan Stewart
*Acting Director of the United States Patent and Trademark Office*